United States Patent [19]

Schwarz

[11] 4,402,296

[45] Sep. 6, 1983

[54] DUAL FUEL SUPPLY SYSTEM AND METHOD FOR AN INTERNAL COMBUSTION ENGINE

[76] Inventor: Walter J. Schwarz, PA 212 Beech Mountain, Banner Elk, N.C. 28604

[21] Appl. No.: 260,252

[22] Filed: May 4, 1981

[51] Int. Cl.³ .................. F02B 75/12; F02M 59/00; F02M 43/00; F02D 19/00

[52] U.S. Cl. .................. 123/575; 123/1 A; 123/25 A; 123/576; 123/577

[58] Field of Search .............. 123/25 A, 1 A, 575, 123/576, 577; 220/470; 252/387

[56] References Cited

U.S. PATENT DOCUMENTS

| | | | |
|---|---|---|---|
| 2,563,764 | 8/1951 | Wachter | 123/1 A |
| 2,720,869 | 10/1955 | Beuans | 123/1 A |
| 2,947,599 | 8/1960 | Ennis | 123/1 A |
| 4,019,477 | 4/1977 | Overton | 123/1 A |
| 4,031,864 | 6/1977 | Crothers | 123/1 A |
| 4,210,103 | 7/1980 | Dimitroff | 123/1 A |
| 4,323,046 | 4/1982 | Barber | 123/575 |
| 4,342,287 | 8/1982 | Concepcion | 123/575 |

Primary Examiner—Ronald B. Cox
Attorney, Agent, or Firm—Dority & Flint

[57] ABSTRACT

A method and system is disclosed for supplying an internal combustion engine with a plurality of fuels wherein a first fuel source 10 which is conventional lead-free gasoline is provided and a second source of fuel 12 which consists of from 180 to 190 proof ethanol is provided as a second fuel source. The fuels are maintained separately and are fed to the intake manifold 18 of the internal combustion engines separately and simultaneously via injection valves 34 and 36. Upon injection to the heated intake manifold, the fuels are vaporized and mixed in the vapor phase prior to combustion in the combustion chambers 32. An electric coil 46 is provided for heating the alcohol fuel and enhancing vaporization. The method also includes injecting water vapor into the combustion chamber with the gasoline and alcohol in the ratio of 0.5 to 2.5 percent and of including either Diethanolaminebenzoate, Dimethylbenzalkoniumchloride, Dicyclohexylaminenitrite, and/or Mercaptobenzothiazole as corrosion inhibitors.

9 Claims, 1 Drawing Figure

DUAL FUEL SUPPLY SYSTEM AND METHOD FOR AN INTERNAL COMBUSTION ENGINE

BACKGROUND OF THE INVENTION

The invention relates to a method and system for utilizing alcohol and gasoline separately and simultaneously in an internal combustion engine in a manner which eliminates the problems in the production, supplying, and utilization of these fuels in a blended configuration.

Automotive fuels commonly used in the United States are gasoline, diesel oil, and recently gasohol, a fuel blend of anhydrous ethyl alcohol (ethanol, 200 proof) and gasoline (lead free) normally found in a ratio of ten percent alcohol and ninety percent gasoline. However, there are certain problematic restrictions, both technical and economical in the production and use of gasohol. More than ten percent of two hundred proof ethanol in the gasohol blend causes phase separation in the fuel tank resulting in the separation of the gasoline and alcohol into two immiscible layers. The use of a lesser grade of alcohol, in any amount, such as 190 proof (containing five percent water) or 180 proof alcohol (containing ten percent water) will also cause phase separation.

Because 200 proof ethyl alcohol is very hygroscopic it attracts water or moisture from the atmosphere and thereby becomes less than 200 proof which, especially at low temperatures, causes the phase separation in the fuel tank. While certain additives may be added to the gasohol blend in order to inhibit phase separation, these chemicals are expensive and may act as pollutants or ignition retardants. The blending operation involved in the production of gasohol has to be performed under conditions which exclude the possibility of water or moisture absorption. This increases the cost of gasohol. When storing or transporting gasohol similar precautions must be taken in order to avoid moisture absorption.

Operational commercial grades of ethyl alcohol (180-190 proof) can be produced easily at atmospheric pressure. However, rectifying this grade of alcohol to make it two hundred proof is expensive as the last trace of water is not easily removed. Therefore, if 180-190 proof ethyl alcohol could be used as a fuel grade alcohol cost savings at the levels of production, handling, and use would accrue.

Attempts to remedy some of the above mentioned problems have been made such as in U.S. Pat. No. 4,019,477 wherein a system is disclosed for supplying an internal combustion engine with different fuels under different loads. A separate tank for gasoline fuel and for alcohol fuel is provided and an auxiliary carburetor meters the alcohol fuel in relation to engine load. However, the alcohol fuel is arranged to provide a substantial portion of the required fuel-air mixture only under idle and low loads and the gasoline is utilized under high load conditions. Mixture of the fuels occurs in an atomized phase but no emphasis is given vaporization of the alcohol.

In U.S. Pat. No. 4,031,864 a system is disclosed for utilizing multiple fuels in an internal combustion engine wherein a single fuel tank is employed in which phase separation of a gasoline/ethanol blend is induced by the addition of water. Means are provided for supplying the fuels separately and utilizing them in predetermined ratios in the general combustion engine. Thus, the problems of producing and supplying a blend of gasoline and alcohol to the motorist are still encountered. Furthermore, problems are encountered with maintaining the different fuels in separate layers in the fuel tank during operation of vehicles and preventing them from mixing due to agitation when the automobile is in motion. Such agitation causes the separated fuel components and water to form a fairly coarse, rather non-uniform and unstable emulsion impairing normal operation of the engine.

Accordingly, an important object of the present invention is to provide a system and method for reducing the problems and the cost of the production, handling, and usage of alcohol fuels in motor vehicles.

SUMMARY OF THE INVENTION

The above objectives are accomplished according to the present invention by a method of supplying gasoline and alcohol separately to the engine which includes providing separate sources for the gasoline and the alcohol fuels which consist of 180-195 proof ethanol alcohol and a corrosion inhibitor free of non-volatile mineral salts. The gasoline and alcohol are fed separately and simultaneously in fixed predetermined ratios to the intake manifold of the internal combustion engine and vaporized where they are mixed in the vapor phase prior to combustion. The alcohol fuel is preheated during delivery to the intake manifold enhancing vaporization.

Thus, the technical problems and costs of the alcohol fuel component of the fuel system are reduced considerably. A higher ratio of alcohol than the 10 percent limit inherent in gasohol can be used, preferably at predetermined proportions of from 11 to 25 percent of 180-195 proof ethanol over the range of engine operation conditions.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
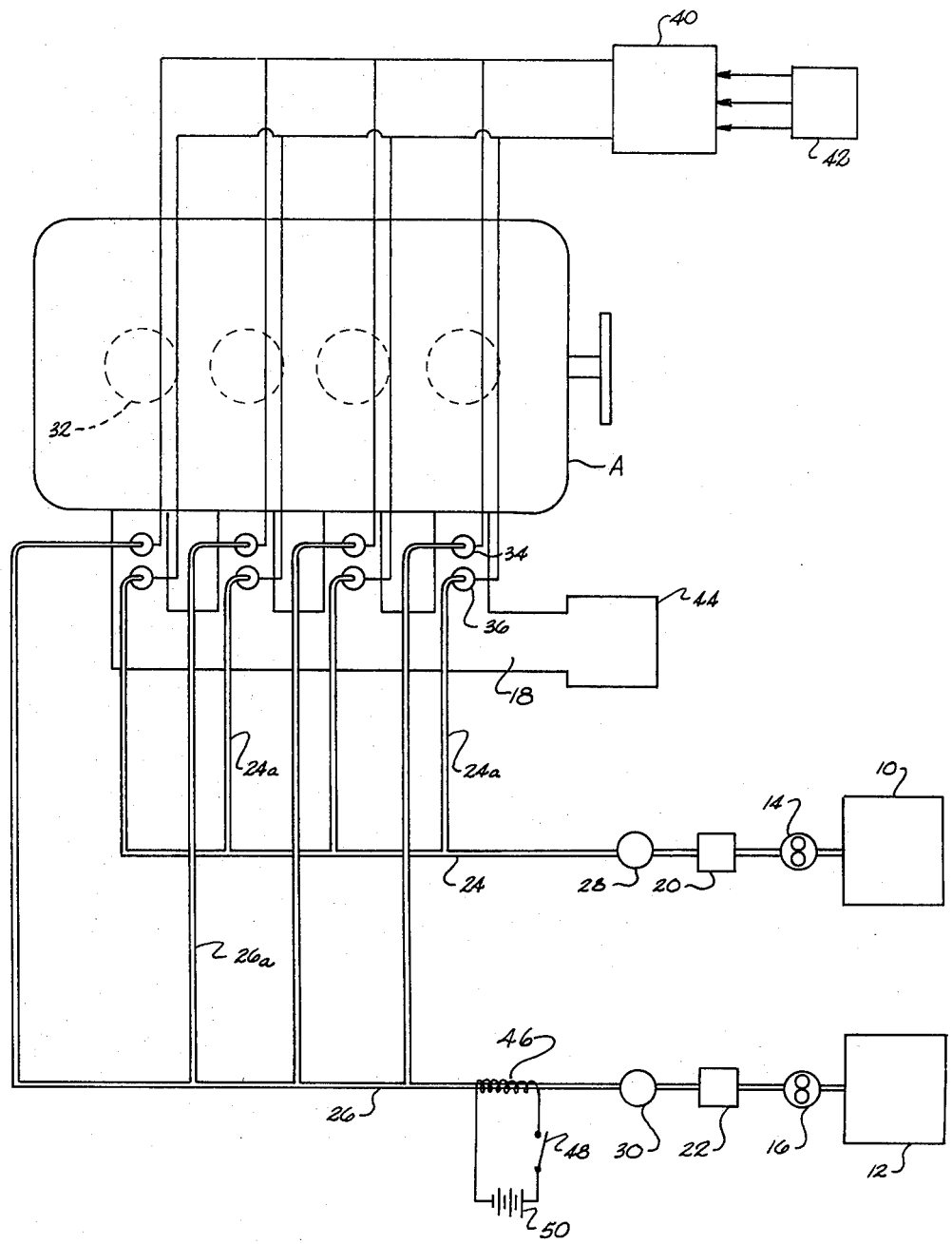
FIG. 1 is a schematic diagram of a method and system for utilizing a plurality of fuels in an internal combustion engine according to the invention.

The invention relates to a system and method of operating an internal combustion engine of the type having a plurality of combustion chambers and an intake manifold through which fuel is distributed to the combustion chambers.

A first source of gasoline fuel is provided along with a second source of alcohol fuel which is separate from the first source. The gasoline fuel is delivered to the intake manifold in a predetermined amount in relation to engine operating parameters, and the alcohol fuel is simultaneously delivered to the intake in predetermined proportions related to the amount of gasoline fuel and engine parameters. The two fuels are vaporized and mixed in the intake manifold prior to combustion in the combustion chamber.

In a preferred embodiment, the alcohol fuel is provided by and consists of 180 to 195 proof ethanol, which includes corrosion inhibitors free of non-volatile mineral or inorganic salts such that the inhibitor chemicals burn off without leaving a residue such as, e.g., a metaloxide. Certain of these inhibitors exhibit sufficient vapor pressure to be active in the vapor phase, so that they are effective, e.g., in the enclosed air space above the liquid level of the alcohol in the fuel tank or a storage vessel. Suitable classes of inhibitors are Quaternary Cationic Surfactants, (having substantivity to metal surfaces), Mercaptothiazoles, volatile Aminonitrites, Alkylaminebenzoates, and Alkanolaminebenzoates. Substantivity characterizes certain cationic compounds, which when in contact with metal surfaces, plate out in thin (monomolecular) layers, firmly bonded, forming protective coatings which, in this case inhibit corrosion.

The inhibitors of preference, used alone or together in varying combinations and ratios, adjusted to a pH of 7.0 to 8.5, are 0.02–0.15% Dimethylbenzalkoniumchloride; 0.03–0.30% Mercaptobenzothiazole; 0.05–0.35% Dicylclohexylaminenitrite; and/or 0.05–0.30% of Diethanolaminebenzoate. Heating of the alcohol when needed, prior to delivery to the intake manifold is provided by a heating coil so as to enhance the vaporization of the alcohol fuel. The alcohol is supplied to the engine in proportions of 11 to 25% of the total fuel amount depending upon the engine operating conditions. The alcohol and gasoline are injected into the heated intake manifold separately and simultaneously in constant proportions which vary over the range of engine loads. Water vapor is introduced to the combustion chambers with the alcohol in a ratio of 0.55% to 2.5% of total fuel mixture.

Referring now in more detail to the drawing, a system is disclosed for carrying out the method according to the invention wherein an internal combustion engine A is supplied with gasoline from a first fuel source 10 which may be lead-free gasoline and a second fuel source, alcohol preferably in the form of ethyl alcohol, is provided at 12. Separate pumps 14 and 16 are provided, respectively, for delivering the fuels to an intake manifold 18 of the internal combustion engine. Suitable pressure regulators 20 and 22 are carried in the respective fuel lines 24 and 26. The electrically driven pumps 14 and 16 and respective pressure regulators maintain fuel pressure within fuel distributors 28 and 30 and fuel lines 24 and 26, respectively.

As illustrated, fuel is injected into the intake manifold opposite the intake valve of the various combustion chambers 32. For this purpose, conventional fuel injector valves 34 may be provided for injecting the alcohol and fuel injector valves 36 for injecting the gasoline. Branch fuel delivery lines 24a deliver gasoline from distributor 28 to the appropriate gasoline fuel injector valve and branch lines 26a deliver the alcohol to the corresponding alcohol fuel injector valve. A conventional electronic fuel injection unit 40 is provided for controlling the pulse-width duration which holds the fuel injector valves open for a predetermined length of time in order to deliver a predetermined quantity of fuel. The fuel injection unit 40 determines the ratio and proportion of alcohol fuel which need be injected along with the gasoline for different engine operation conditions in response to parameters fed to the unit 40 from conventional sensors illustrated schematically at 42 such as engine speed, intake manifold pressure, throttle setting, exhaust temperature, etc. For more details of such a fuel injection system and unit, reference may be had to U.S. Pat. No. 3,741,171. Alternately, a separate electronic fuel control unit may be used for each fuel to control each set of valves. Air, of course, is admitted through air intake 44 which is mixed with the vaporized gasoline and alcohol prior to combustion.

A coil heater 46 is provided for heating the alcohol fuel prior to delivery to intake manifold 18 to enhance the vaporization thereof. For this purpose, a dashboard switch 48 may be provided in the automobile which when closed will heat the coil 46 by means of battery 50 which may be the automobile battery.

The system also contemplates the use of gasoline alone when and where ethanol is not available.

While a preferred embodiment of the invention has been described using specific terms, such description is for illustrative purposes only, and it is to be understood that changes and variations may be made without departing from the spirit or scope of the following claims.

What is claimed is:

1. A method of operating an internal combustion engine of the type having a plurality of combustion chambers and an intake manifold through which fuel is delivered to said combustion chamber, said method comprising:

providing a first source of gasoline fuel;
providing a second source of alcohol fuel separate from said first source in a physically separated storage container;
delivering said gasoline fuel directly to said intake manifold in a predetermined amount;
delivering said alcohol fuel directly to said intake manifold separately from said gasoline fuel in a predetermined ratio to said amount of gasoline fuel;
vaporizing said fuels in said intake manifold;
injecting and mixing said fuels in vapor phase at the intake manifold ports prior to combustion in said combustion chamber; and
adding a corrosion inhibitor in solute with said alcohol fuel to inhibit corrosion by the alcohol, said inhibitor including a component compound having sufficient vapor pressure to be active in the vapor phase and effective to inhibit corrosion in exposed air spaces in addition to the liquid space of said alcohol fuel mixture in said storage container.

2. The method of claim 1 wherein said alcohol fuel is provided by 180 to 195 proof ethanol.

3. The method of claim 1 including adding a corrosion inhibitor free of non-volatile mineral salts to said alcohol fuel comprising a cationic surfactant compound having substantivity to metal surfaces.

4. The method of claim 2 including introducing water vapor into said combustion chamber with said gasoline and alcohol in the ratio of 0.5 to 2.5 percent.

5. The method of claim 1 including heating said alcohol fuel prior to delivery into said intake manifold to enhance the vaporization thereof.

6. The method of claim 3 wherein said corrosion inhibitor includes 0.02–0.15% Dimethylbenzalkoniumchloride; 0.03–0.30% Mercaptobenzothiazole; 0.05–0.35% Dicyclohexylaminenitrite; or 0.05–0.30% Diethanolaminebenzoate either alone or in combination adjusted to a pH of 7 to 8.5.

7. The method of claim 2 including supplying said alcohol in proportions of 11 to 25 percent of said total fuel amount.

8. A method of operating an internal combustion engine of the type having a plurality of combustion chambers and an intake manifold through which fuel is delivered to said combustion chamber, said method comprising:

provide a source of gasoline fuel;

providing a second source of alcohol fuel separate from said first source consisting of less than 195 proof alcohol;

adding a corrosion inibitor free of nonvolatile mineral salts to said alcohol fuel;

delivering said gasoline fuel to said intake manifold in a predetermined amount;

heating said alcohol fuel prior to delivery into said intake manifold to enhance the vaporization thereof;

delivering said alcohol fuel to said intake manifold in a predetermined proportion to said amount of gasoline fuel at all engine loads;

supplying said alcohol in proportions of 11 to 25 percent of said total fuel amount over the range of said engine loads;

vaporizing said fuels in vapor phase prior to combustion in said combustion chamber;

introducing water vapor into said combustion chamber with said gasoline and alcohol in the ratio of 0.5 to 2.5 percent; and including in said corrosion inhibitor a cationic surfactant having substantivity to metal surfaces and being active in both the solute and vapor phase to effectively protect exposed air spaces in addition to the liquid space of said alcohol fuel.

9. The method of claim 8 wherein said corrosion inibitors includes 0.02–0.15% Dimethylbenzalkoniumchloride; 0.03–0.30% Mercaptobenzothiazole; 0.05–0.35% Dicyclohexylaminenitrite; or 0.05–0.30% Diethanolaminebenzoate.

* * * * *